United States Patent
Savaresi et al.

(10) Patent No.: US 8,473,157 B2
(45) Date of Patent: Jun. 25, 2013

(54) CONTROL OF A SUSPENSION SYSTEM OF A VEHICLE PROVIDED WITH FOUR SEMI-ACTIVE SUSPENSIONS

(75) Inventors: Sergio M. Savaresi, Milan (IT); Cristiano Spelta, Milan (IT); Diego Delvecchio, Milan (IT); Gabriele Bonaccorso, Turin (IT); Fabio Ghirardo, Turin (IT); Sebastiano Campo, Turin (IT)

(73) Assignees: Fiat Group Automobiles S.p.A., Turin (IT); Politecnico di Milano, Milan (IT)

( * ) Notice: Subject to any disclaimer, the term of this patent is extended or adjusted under 35 U.S.C. 154(b) by 0 days.

(21) Appl. No.: 13/456,924

(22) Filed: Apr. 26, 2012

(65) Prior Publication Data

US 2012/0277953 A1 Nov. 1, 2012

(30) Foreign Application Priority Data

Apr. 29, 2011 (EP) .................................... 11425120

(51) Int. Cl.
*B60G 17/016* (2006.01)
*B60G 17/015* (2006.01)
*B60G 17/005* (2006.01)

(52) U.S. Cl.
USPC ......... 701/38; 280/5.5; 280/5.501; 280/5.513

(58) Field of Classification Search
None
See application file for complete search history.

(56) References Cited

U.S. PATENT DOCUMENTS

| | | | |
|---|---|---|---|
| 6,950,712 B2 * | 9/2005 | Ulyanov et al. ................. | 700/28 |
| 7,035,836 B2 * | 4/2006 | Caponetto et al. ............. | 706/47 |
| 2011/0035103 A1 * | 2/2011 | Arenz .............................. | 701/37 |
| 2012/0029770 A1 * | 2/2012 | Hirao et al. ..................... | 701/38 |
| 2012/0078470 A1 * | 3/2012 | Hirao et al. ..................... | 701/38 |
| 2012/0277953 A1 * | 11/2012 | Savaresi et al. ................. | 701/38 |

FOREIGN PATENT DOCUMENTS

WO  WO 2008/010075 A2  1/2008

OTHER PUBLICATIONS

J. Campos et al., "Active Suspension Control of Ground Vehicle Heave and Pitch Motions", Proceedings of the 7th Mediterranean Conference on Control and Automation (MED99) Haifa, Israel— Jun. 28-30, 1999.
Sergio M. Savaresi, "A Single-Sensor Control Strategy for Semi-Active Suspensions", IEEE Transaction Control Systems Technology, vol. 17, No. 1, Jan. 2009.
Sergio M. Savaresi, et al., "Mixed Sky-Hook and ADD: Approaching the Filtering Limits of a Semi-Active Suspension", Transactions of the ASME, vol. 129, Jul. 2007.

* cited by examiner

*Primary Examiner* — Thomas Black
*Assistant Examiner* — Tyler Paige
(74) *Attorney, Agent, or Firm* — Dickstein Shapiro LLP

(57) ABSTRACT

A method for controlling four semi-active suspensions of a vehicle comprising the steps of: determining, for each semi-active suspension, a first and a second signal representative of the acceleration and speed of the sprung mass; determining, for a pair of semi-active suspensions arranged on one side of the vehicle a third and a four signal representative of the acceleration and pitch speed; calculating for each semi-active suspension, a first damping coefficient as a function of the difference between the first and second signal squared; calculating for each semi-active suspension, a second damping coefficient as a function of the difference between the third and the four signal squared; for each semi-active suspension, comparing the first and the second damping coefficient for determining the higher coefficient; applying to each force generator device, an electronic control signal indicative of the respective high damping coefficient.

15 Claims, 7 Drawing Sheets

CONTROL OF A SUSPENSION SYSTEM OF A VEHICLE PROVIDED WITH FOUR SEMI-ACTIVE SUSPENSIONS

TECHNICAL SECTOR OF THE INVENTION

The present invention relates to a control of a suspension system of a vehicle provided with four semi-active suspensions. In particular, the present invention relates to an independent control of four controllable force generators comprised in four respective semi-active suspensions of a suspension system mounted on a four-wheel vehicle, in particular a motor vehicle, to which explicit reference will be made in the following description without therefore loosing in generality.

STATE OF THE ART

As known, latest-generation vehicles are provided with a suspension system having the function of damping the oscillatory motion of the vehicle so as to reduce oscillations, pitch and heave of the same, to ensure, on one hand, ride comfort of the passengers aboard the vehicle as the roughness of the terrain varies and, on the other hand, to guarantee handling as the contact force between tire and road surface varies.

In particular, latest-generation suspension systems essentially comprise four suspensions of semi-active type, each of which is interposed between the body or chassis of the vehicle, herein indicated as "sprung mass" and a respective wheel of the vehicle, indicated hereinafter as "unsprung mass". It is worth specifying that the unsprung mass, comprises, in addition to the rim and to the tire which compose a wheel, also the braking system and the motion transmission members associated to the wheel itself.

Each semi-active suspensions typically comprises a spring, characterized by a predetermined elastic constant interposed between the sprung mass and the unsprung mass; and a force generator device or shock absorber, which interconnects the sprung mass to the unsprung mass.

The force generator device is structured so as to adjust the damping force exerted between the sprung mass and the unsprung mass, as a function of an electric control signal generated by an electronic control system.

In particular, the electronic control system comprises measuring system which determines some predetermined physical quantities, such as, for example, the speed of the unsprung mass or by the sprung mass along a vertical direction and/or the vertical acceleration induced on the semi-active suspension when the vehicle runs on a road profile; and an electronic control device, which generates the control signal to be imparted to each force generator device, on the basis of a determined damping law applied to the determined physical quantities.

The measuring system essentially contemplates at least one accelerometer installed on the sprung mass and/or on the unsprung mass at each vehicle suspension.

In the case in point, international application WO 2008/010075, filed by "Politecnico di Milano", describes a method for controlling a force generator comprised in a semi-active suspension, wherein it is contemplated to essentially discriminate a dominating energizing frequency on the basis of the measured vertical acceleration of the suspension; and to select the damping coefficient to be controlled by the semi-active suspension, by means of the force generator, on the basis of the calculated dominating vertical energizing frequency.

In particular, the method described in the aforementioned international application essentially contemplates detecting a first signal representative of the sprung mass acceleration; detecting a second signal representative of the sprung mass speed; determining a value of the difference between the first signal squared and the second signal squared; and applying to the force generator a control signal as a function of the value of the difference between the first and the second signal squared so as to determine whether the semi-active suspension has high or low frequency vertical dynamics.

In the case in point, the method described in the aforementioned international application assigns to the damping coefficient used by the force generator a predetermined minimum value or a maximum value on the basis of the frequency of high or low frequency vertical dynamics.

The aforesaid method completely disregards the entity of the energizing determined by the road profile, but only considers the stress frequency that it implies on the sprung mass of the vehicle. Therefore, by implementing the method described above, it may occur that low frequency events which are not very relevant in energy terms determine the selection of the maximum predetermined value, causing a maximum damping, and introducing, as a consequence, undesired vibrations with negative repercussions on comfort aboard the vehicle. In other words, the aforementioned method contemplates selecting an alternative maximum or minimum damping coefficient on the basis of the body dynamics. It may consequently occur that the method determines the instantaneous selection of maximum damping when instead a continuous transition would be more effective in terms of comfort.

Furthermore, the application of the solution described in the international application published under number WO 2008/010075 on a four-wheel vehicle necessarily contemplates using four accelerometers each associated to a corresponding semi-active suspension.

OBJECT AND SUMMARY OF THE INVENTION

The applicant has conducted an in-depth study with the objective of identifying a solution which specifically allows to reach the following objectives:
  reduce the number of accelerometers needed for controlling four semi-active suspensions present in a four-wheel vehicle so as to reduce the overall manufacturing cost of the system, on one hand, and on the other to simplify the same in terms of wiring, wire fastening system, brackets etc.;
  to improve comfort onboard also when the semi-active suspensions are subject to low frequency events which are not very relevant in terms of energy.

It is thus the object of the present invention to make a solution available which allows to reach the objectives indicated above.

This object is reached by the present invention because it relates to a device and a method for controlling the vertical dynamics of a vehicle provided with four semi-active suspensions, as defined in the attached claims.

DETAILED DESCRIPTION OF PREFERRED EMBODIMENTS OF THE INVENTION

The present invention will now be described in detail with reference to the appended figures to allow a person skilled in the art to make it and use it. Various changes to the described embodiments will be immediately apparent to people skilled in the art, and the described generic principles may be applied to other embodiments and applications without because of this departing from the scope of protection of the present invention, as defined in the appended claims. Therefore, the present invention must not be considered limited to the described and illustrated embodiments but instead confers the broadest scope of protection, in accordance with the principles and features described and disclosed herein.

Figure 1:
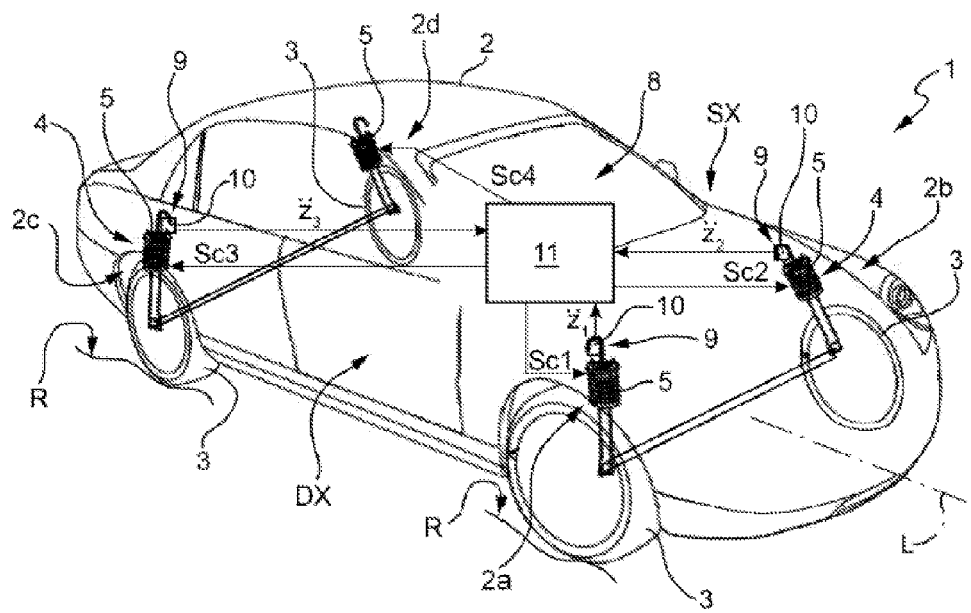
FIG. 1 diagrammatically shows a perspective view with parts removed for clarity of a vehicle comprising a suspension system made according to the dictates of the present invention.

FIG. 1 diagrammatically shows by way of non-limiting example, a vehicle 1, such as, for example, motor vehicle comprising a body/chassis 2, indicated hereinafter as sprung mass Ms, four resting wheels 3 of the vehicle on the ground (indicated hereinafter as road profile R), each of which will be indicated hereinafter as unsprung mass Ns, and a suspension system 4 having the function of damping the oscillatory movement of the vehicle 1 to reduce pitch and/or heaving.

The suspension system 4 comprises four semi-active suspensions 5 associated to the wheels 3, thus arranged at the four angles 2a, 2b, 2c and 2d of the body/chassis 2 of the vehicle 1 i.e. at the ends of the front and rear axles of the vehicle 1, and are interposed between the sprung mass Ms and the unsprung mass Ns in known manner and thus not described in detail.

Each semi-active suspension 5 is structured so as to adjust the damping force exerted between sprung mass Ms and unsprung mass Ns according to an electric control signal Sci (i comprised between 1 and 4) associated to a damping coefficient $C_i^T(t)$ calculated in the manner described in detail below.

With reference to the diagrammatically example shown in FIG. 2, each semi-active suspension 5 comprises a mechanical elastic member, preferably a spring 6, having a predetermined elastic constant k, which is interposed between the sprung mass Ms and the unsprung mass Ns; and a controllable damper, hereinafter indicated as force generator device 7, which is structured so as to adjust the damping force between the sprung mass Ms and the unsprung mass Ns of the vehicle 1, as a function of the electric control signal Sci, so as to control the vertical dynamics of the unsprung mass Ns.

The suspension system 4 is further provided with an electronic control system 8 comprising a measuring system 9, which is adapted to measure a series of physical quantities introduced by the road profile R on the three semi-active suspension 5 of the vehicle 1, such as, for example, vertical acceleration, $\ddot{z}$ of the sprung mass Ms and/or the speed $\dot{z}$ of the sprung mass Ms along a vertical direction.

Figure 2:
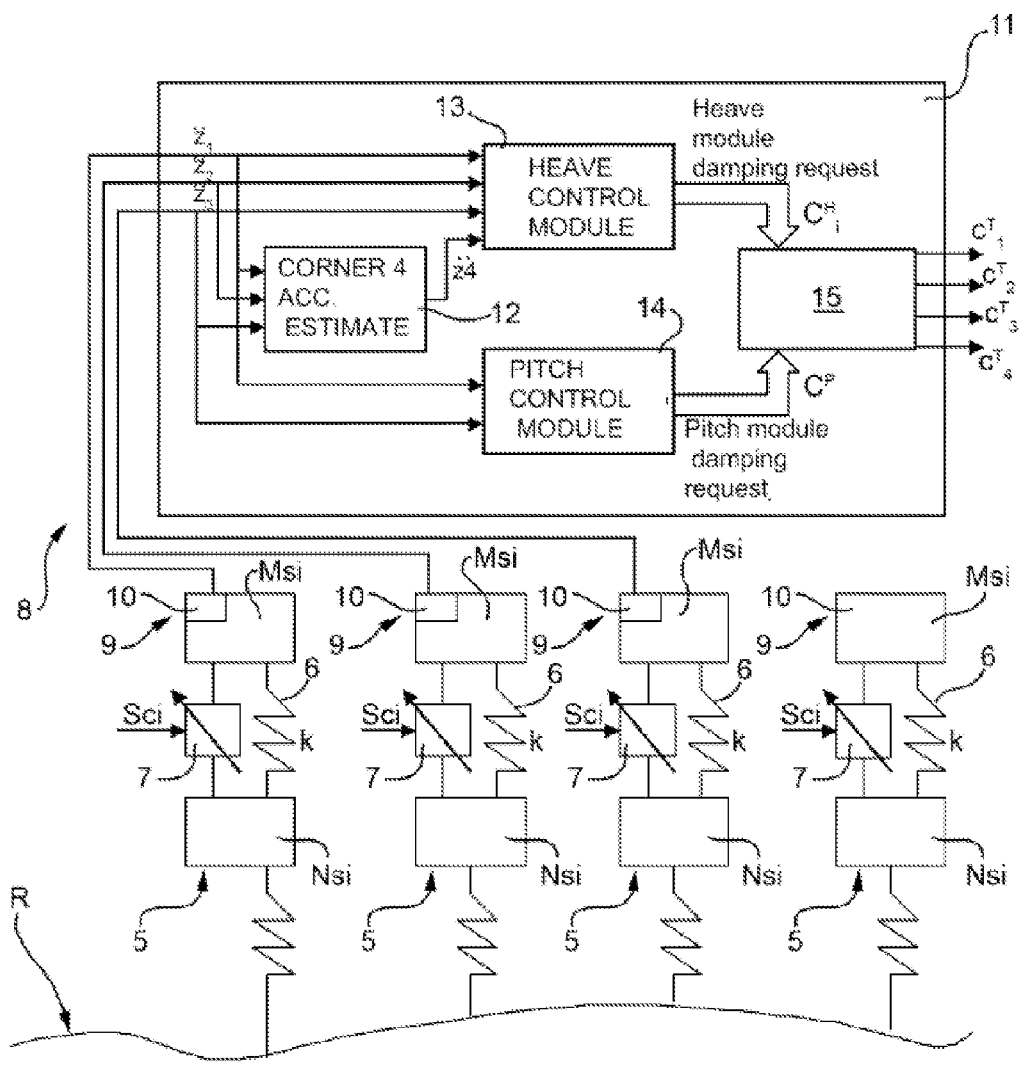
FIG. 2 is a diagram of a control system of the suspension system shown in FIG. 1.

With reference to a preferred embodiment shown in FIGS. 1 and 2, the measuring system 9 comprises three acceleration sensors 10, such as, for example, accelerometers, which are arranged on the sprung masses Ms present in the three angles 2a, 2b and 2c of the vehicle 1, respectively, which, in the illustrated example, correspond to the two front angles 2a 2b of the vehicle 1, and to a rear angle 2c of the vehicle 1, and are adapted to generate three measuring signals associated to the measured vertical accelerations.

It is however worth specifying that the arrangement of the acceleration sensors 10 in the three angles of the vehicle 1 shown in FIG. 1 must not be considered limiting because the acceleration sensors 10 may be distributed in the angles themselves according to any arrangement, also different from that shown.

With reference to the preferred embodiment shown in FIG. 2, the electronic control system 8 further comprises a processing/control unit 11, which is configured for:

- receiving in input the three measuring signals representative of the three vertical accelerations $\ddot{z}_1$, $\ddot{z}_2$, $\ddot{z}_3$ of the sprung masses $Ms_1$, $Ms_2$ and $Ms_3$ associated to the angles 2a, 2b and 2c and measured by the respective acceleration sensors 10;
- processing the three accelerations $\ddot{z}_1$, $\ddot{z}_2$, $\ddot{z}_3$ so as to estimate the acceleration $\ddot{z}_4$ of the sprung mass $Ms_4$ associated to the fourth angle 2d, free from acceleration sensor;
- processing the three measured accelerations $\ddot{z}_1$, $\ddot{z}_2$, $\ddot{z}_3$ ad the estimated acceleration $\ddot{z}_4$ for calculating the first damping coefficients $c^H_i$ (i comprised between 1 and 4) adapted to be set on the semi-active suspensions 5 by means of a control of the force generator device 7, to minimize the vertical acceleration variance, i.e. the vertical dynamics of each semi-active suspension 5;
- processing two of the four accelerations, e.g. accelerations $\ddot{z}_1$ and $\ddot{z}_3$, associated to two sprung masses $Ms_1$ and $Ms_3$ arranged in two respective angles, e.g. the angles 2a and 2c, arranged on the same side Dx or Sx (right side or left side, parallel to the longitudinal axis L of the vehicle 1 shown in FIG. 1), so as to determine second damping coefficients $c^P_i$ (i comprised between 1 and 4) to be set on, the semi-active suspensions 5 by means of the force generator control 7 to minimize the pitch dynamics of the vehicle 1;
- comparing each first damping coefficient $c^H_i$ with the second damping coefficient $c^P_i$ each associated to the same angle, so as to determine the higher damping coefficient $C^T_i = MAX(c^H_i, c^P_i)$ between the two, and to generate for each semi-active suspension 5 the electric control signal Sci indicative of the higher damping coefficient $C^T_i$ to be set on the semi-active suspension 5 present in the angle itself by means of the force generator device 7.

With reference to FIG. 2, the processing/control unit 11 essentially comprises an acceleration estimate module 12, a first control module 13, a second control module 14, and a supervisor module 15.

The acceleration estimate module 12 is configured to estimate the acceleration along a vertical direction of the sprung mass Ms associated to the fourth angle 2d of the vehicle 1 free from accelerator sensor.

Figure 3:
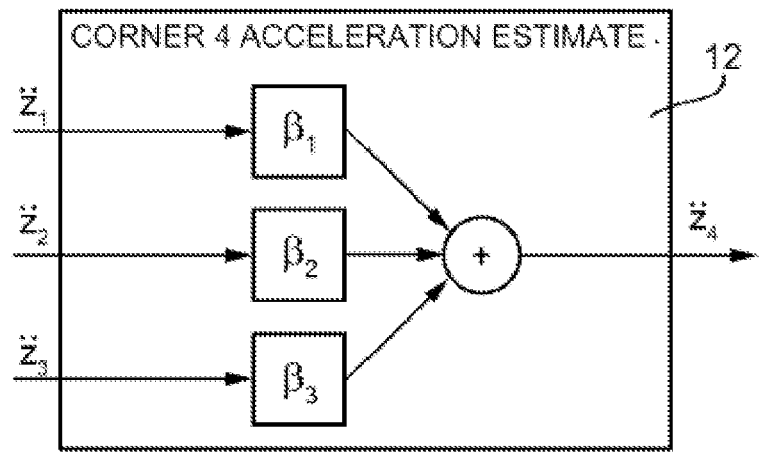
FIGS. 3 and 4 show equivalent functional blocks of the control system shown in FIG. 2.

In the embodiment shown in FIGS. 2 and 3, the acceleration estimate module 12 is shaped so as to receive in input the three measuring signal indicative of the three vertical associations $\ddot{z}_1$, $\ddot{z}_2$, $\ddot{z}_3$ of the sprung masses $Ms_1$, $Ms_2$ and $Ms_3$ associated to the measured angles 2a, 2b and 2c of the respective acceleration sensors 10.

The acceleration estimate module 12 is further configured to process the three accelerations $\ddot{z}_1$, $\ddot{z}_2$, $\ddot{z}_3$ so as to estimate the acceleration $\ddot{z}_4$ of the sprung mass $Ms_4$ associated to the fourth angle 2d, free from acceleration sensor, according to an estimate law associated to a predetermined rigid conduction of the chassis 2 in a given frequency band of interest for controlling the vertical dynamics.

In the embodiment shown in FIG. 3, the estimate law associated to a predetermined rigidity condition of the chassis 2, when executed by the acceleration module 12, determines the acceleration $\ddot{z}_4$ by means of the following equation:

$$\ddot{z}_4 = \beta_1 \ddot{z}_1 + \beta_2 \ddot{z}_2 + \beta_3 \ddot{z}_3 \quad [1]$$

where $\beta_1$, $\beta_2$ and $\beta_3$ are predetermined coefficients associated to the respective accelerations and determined by the predetermine rigidity condition of the chassis, to minimize the acceleration $\ddot{z}_4$.

Figure 4:
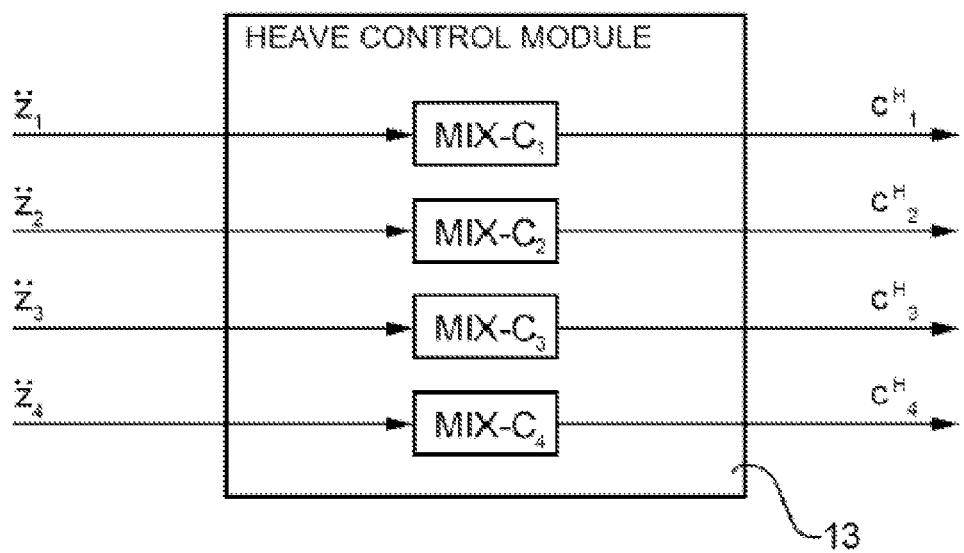
Figure 7:
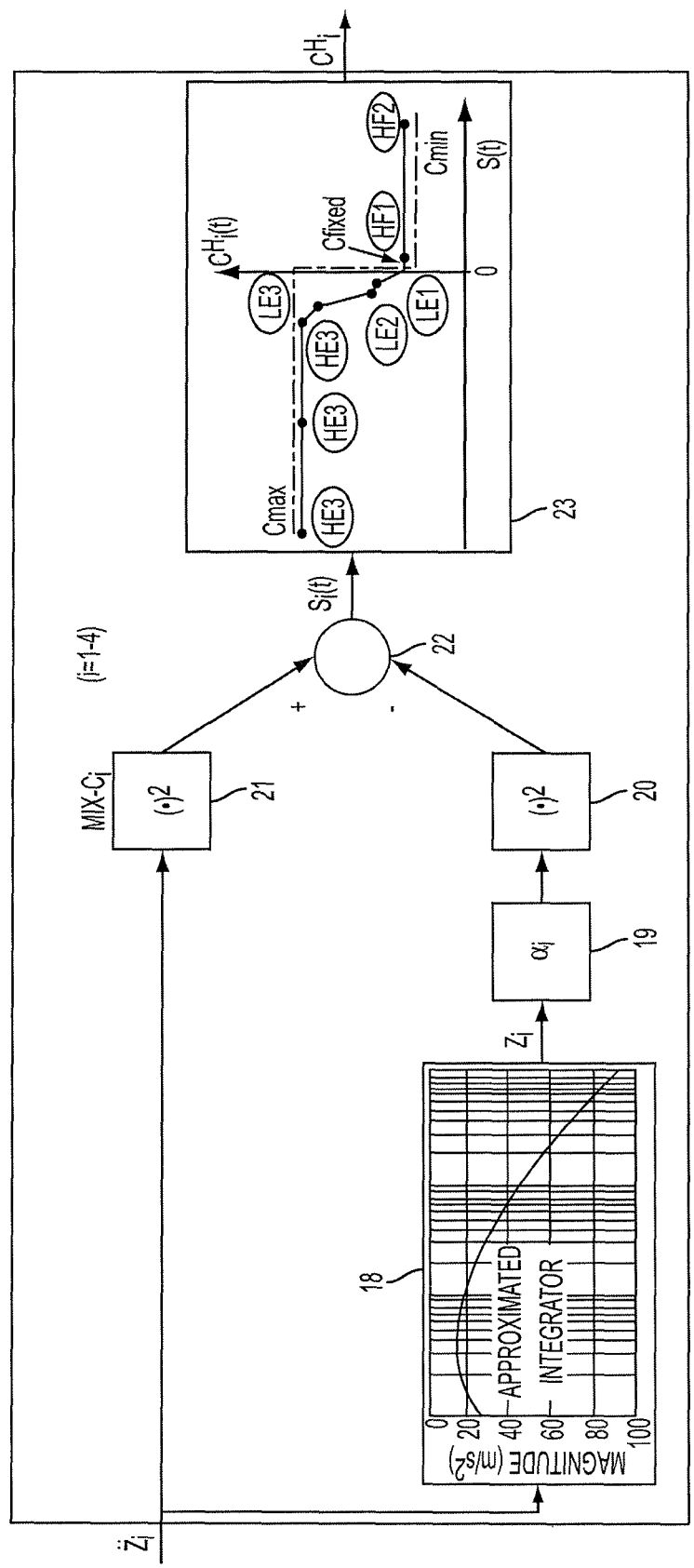
FIGS. 7, 8 and 9 show equivalent functional blocks of the control system shown in FIG. 2.

With reference to the embodiment shown in FIGS. 4 and 7, the first control module 13 is configured so as to determine the first damping coefficients $c^H_i$ to be set on the corresponding force generator devices 7 so as to control the vertical dynamics of the sprung masses Msi in decentralized manner.

The first control module 13 is configured for: receiving in input the three measured accelerations $\ddot{z}_1$, $\ddot{z}_2$, $\ddot{z}_3$ and the estimated acceleration $\ddot{z}_4$; determining the vertical speeds $\dot{z}_1$, $\dot{z}_2$, $\dot{z}_3$, $\dot{z}_4$ associated to the respective sprung masses $Ms_1$, $Ms_2$, $Ms_3$ and $Ms_4$, as a function of the accelerations $\ddot{z}_1$, $\ddot{z}_2$, $\ddot{z}_3$, $\ddot{z}_4$; determining each of the first damping coefficients $c^H_1$, $c^H_2$, $c^H_3$, and $c^H_4$ according to the following calculation law:

$$Si(t) = \ddot{z}_i^2(t) - \alpha_i^2 \dot{z}_i^2(t)$$

$$c(t)_i = fi(Si(t)) \quad [2]$$

where:

$\dot{z}_i(t)$ is the speed expressed in m/s of the i-th sprung mass Msi determined in instant t;

$\ddot{z}_i(t)$ is the acceleration expressed in m/s² of the i-th sprung mass Msi determined in instant t;

$\alpha_i$ is the first value indicative of the invariance frequency or cross-over frequency expressed in radians/second; in particular, the cross-over frequency is indicative of the so-called "dominating energizing frequency" to which the i-th sprung mass Msi is subjected, and comprises an intermediate predetermined value which is, on one hand, higher than the frequencies of the low energizing frequency set at of the i-th sprung mass Msi and, on the other hand, lower than the frequencies of the high energizing frequencies set of the i-th sprung mass Msi; αi is preferably a fixed parameter determined beforehand during a step of designing of the i-th semi-active suspension 5;

$S_i(t)$ is s a first function with provides a second value indicative of the frequency of the energizing energy to which the i-th sprung mass is subjected in instant t; in particular, the negative sign $S_i(t)$ is indicative/associated to a low band; the positive sign $S_i(t)$ is indicative/associated to the high band; while the width of $S_i(t)$ is associated to a measure of the energy quantitative; and $fi(S_i(t))$ is a second function providing a third value which is indicative of the variance of the first damping coefficient $c^H_i$ to be set on the force generator 7 of the i-th semi-active suspension 5, as the second value Si(t) indicative of the frequency and energizing energy to which the i-th sprung mass is subjected in instant t. In other words, the second function $fi(S_i(t))$ is a function which is indicative of the variance of the first damping coefficient $C^H_i$ as the energizing frequency to which the i-th sprung weight is subjected in instant t varies.

From the above, it is worth specifying that the second function $fi(S_i(t))$ differs from the first and second control law described in the aforesaid international patent application WO 2008/010075 because the latter are both based on a continuous step function comprising a maximum damping value and a minimum damping value both constant as the frequency varies and associated to the high and low energizing frequencies. In particular, the maximum value of the discontinuous function, described in international patent application WO2008010075, is associated to a constant maximum damping coefficient $c(t)=c_{max}$ and is provided by the discontinuous function when $S(t)<0$, i.e. when the energizing frequency of the sprung mass, determined by means of the function S(t), is lower than the cross-over frequency, while the second value associated to a minimum predetermined damping coefficient $c(t)=c_{min}$ is provided by the discontinuous function when $S(t)>=0$ when the energizing frequency is higher than the cross-over frequency. Thus the first and second law contemplate a behavior similar to that of a frequency selector, which "switches" the damping coefficient to be set to the force generator device 7 between a maximum and a minimum value predetermined as a function of the determined high/low energizing frequency. The method described in the aforementioned international application WO 2008/010075 is thus limited to considering only the energizing/stress frequency that the road causes on the sprung mass to the vehicle but does not consider the energy, i.e. the energy associated to the energizing caused on the mass itself when subjected to a given energizing frequency. It thus occurs that events which are not very relevant in energy terms, i.e. having a low intensity/energy characterized by a low frequency, determine the switching of the selector which selects the maximum damping coefficient, causing undesired vibrations with negative repressions on comfort aboard the vehicle. Thus, the control method of the suspension described in international application n. WO2008010075 is based exclusively on the information related to the sign of the selector in frequency S(t).

However, studies carried out by the applicant have demonstrated that the value of the module of the value obtained by means of the frequency selector S(t) contains useful information related to the energizing energy, which is bound in terms of quadratic acceleration and vertical speed of the sprung mass Ms. In light of this study, the applicant has identified a method which conveniently determines by means of the selecting function S(t) not only the value correlated to the energizing frequency of the sprung mass Ms, but also a value which is indicative of the energizing energy in instant t caused on the sprung mass by the road profile run by the vehicle 1.

Figure 5:
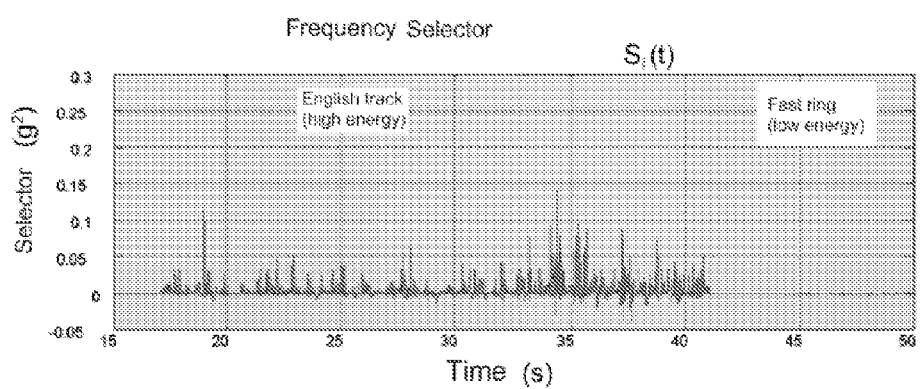
FIG. 5 shows a chart of a set of experimental values of the road energizing energy measured/determined by the applicant by implementing a first function.

FIG. 5 shows a set of experimental values of the road energizing energy measured/determined by the applicant by implementing a first function Si(t) described below, in which it is possible to note that the module of the value obtained by the first function Si(t) itself, i.e. the energizing energy, is subjected to particularly significant instantaneous reduction when the road run by the vehicle passes from a rough pattern (English track) to a flat-smooth pattern (fast ring).

Figure 6:
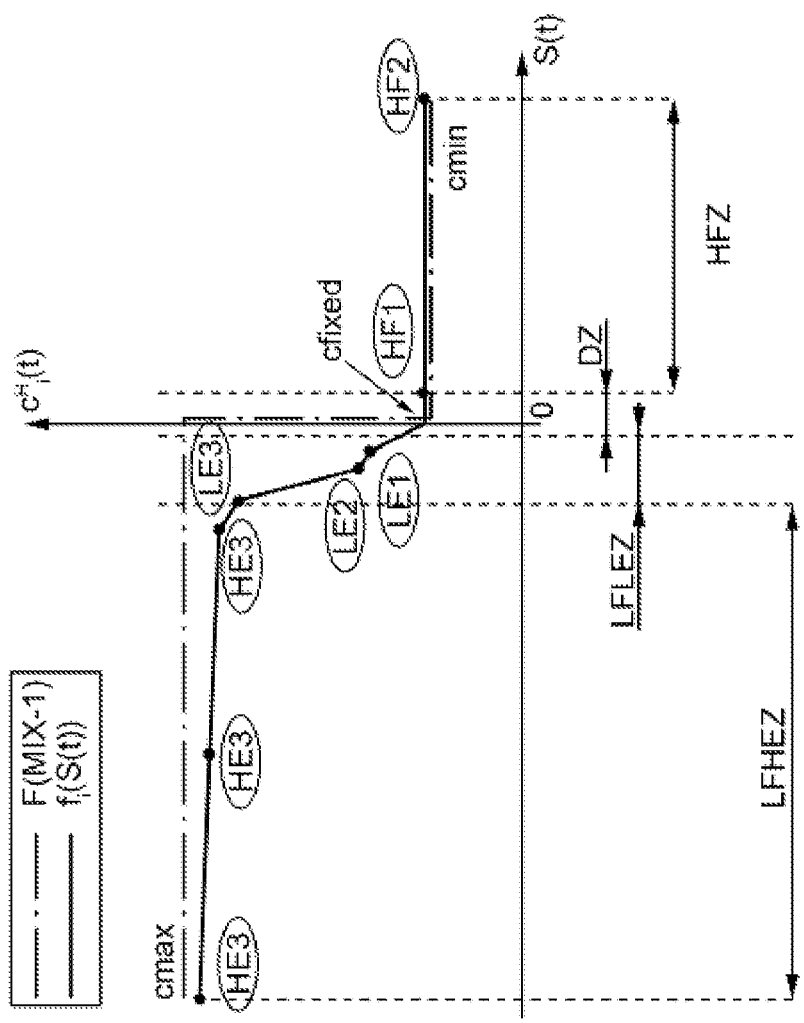
FIG. 6 shows a possible example of a second function associated to a semi-active suspension of the control system shown in FIG. 1.

FIG. 6 instead shows a possible embodiment of the second function $fi(S_i(t))$ associated to the i-th semi-active suspension 5.

The second function $fi(S_i(t))$ is representative of a

Cartesian diagram in which the abscissa axis shows the energizing frequency calculated by means of the first function, i.e. the value of the measure provided by $S_i(t)$, while the ordinate axis shows the variation of the first damping coefficient $c^H_i$ as the energizing frequency varies.

In particular, in the embodiment shown in FIG. 6, the second function $fi(S_i(t))$ is characterized by:

a Dead-Zone—DZ associated to an energizing frequency band deemed irrelevant for vertical dynamics, in which the second function $fi(S_i(t))$ has a first constant damping coefficient $c^H_i$ equal to cfixed;—High-Frequency- Zone—HFZ associated to a high frequency energizing band, and representative in FIG. 6 by a segment which passes through points HF1 and HF2 (associated to one of the experimental values), and indicates the variation of the first damping coefficient $c^H_i$ in the high frequency band;

a Low-Frequency/Low-Energy-Zone—LFLEZ associated to a low entity energizing energy variation in a low frequency energizing frequency band, represented in FIG. 6 by a segment which passes through points LE1, LE2 and LE3 and indicates the variation of the first damping coefficient $c^H_i$ in the "low frequency/low-energy-zone" band;

a Low-Frequency/High-Energy-Zone—LFHEZ associated to a high entity energizing energy variation in a low frequency energizing frequency band, represented in FIG. 6 by a segment which passes through points HE1, HE2 and HE3 and indicates the variation of the first damping coefficient $c^H_i$ in the "low frequency/high-energy-zone" band.

With regards to the above, it is worth underlining that the trend of the second function $fi(S_i(t))$ shown in FIG. 6 was established in order to approximate in "smooth" manner the discontinuous function S(t) described in the aforementioned international application WO 2008/010075 and shown in FIG. 6 with F(MIX-1), so as to obtain, in use, a gradual damping in case of low frequency events, and thus avoid excessively high stiffening which could give rise to annoying vibrations perceivable by the passengers of the vehicle 1.

With reference to FIGS. 4 and 7, the first control module 13 comprises four heave calculation blocks $MIX-C_i$ (i comprised between 1 and 4), each of which is associated to a semi-active suspension 5 and is adapted to receive in input the acceleration $\ddot{z}_i(t)$ associated to the i-th suspended mass $Ms_i$ and outputs the first damping coefficient $c^H_i$ to be set on the force generator device from 7 of the i-th semi-active suspension 5.

According to a preferred embodiment shown in FIG. 7, each heave calculation block $MIX-C_i$ comprises: an integration device 18 which receives in input the acceleration $\ddot{z}_i(t)$ and integrates over time the acceleration $\ddot{z}_i(t)$ so as to output a value indicative of the speed $\dot{z}_i(t)$ of the sprung mass Msi.

Each heave calculation block $MIX-C_i$ further comprises a multiplier device 19, which receives in input the speed $\dot{z}_i(t)$; and multiplies the speed $\dot{z}_i(t)$ for the cross-over $\alpha_i$ frequency; a squarer device 20, which receives in input the value $\alpha_i \cdot \dot{z}_i(t)$ and squares it so as to output the value $(\alpha_i \cdot \dot{z}_i(t))^2$; a squarer device 21, which receives in input the acceleration $\ddot{z}_i(t)$ and squares it so to output $(\ddot{z}_i(t))^2$; a adder node 22, which receives in input the acceleration squared $(\ddot{z}_i(t))$ and the value $(\alpha_i \cdot \dot{z}_i(t))^2$ and calculates the difference between acceleration squared $(\ddot{z}_i(t))^2$ and the value $(\alpha_i \cdot \dot{z}_i(t))^2$ so as to provide the second value S(t).

Each heave calculation block $MIX-C_i$ finally comprises a control block 23, which receives in input the second value Si(t), which is indicative of the energizing frequency of the i-th sprung mass Msi and determines by means of the second function $fi(S_i(t))$ the third value, which is indicative of the variation of the first damping coefficient $c^H_i$ to be set on the force generator 7 of the i-th semi-active suspension 5, as the second value indicative of the energizing frequency to which the i-th sprung mass Msi is subjected in instant t.

Figure 8:
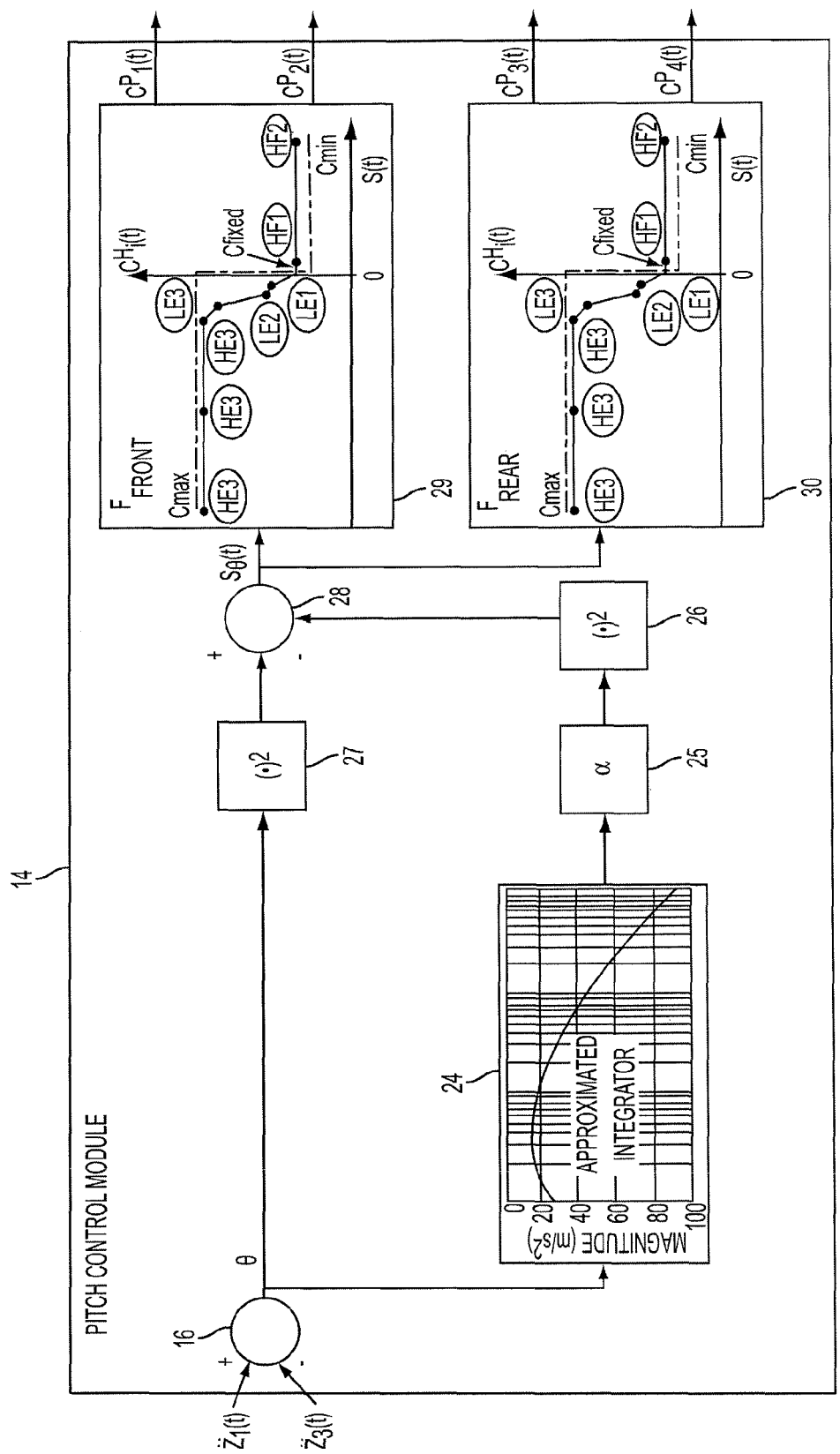

With reference to FIGS. 2 and 8, the second control module 14 is essentially based on an application of the calculation law [2] described above in detail, at the pitch motion of the vehicle 1, instead of the vertical motion described above.

It is indeed possible to process two of the four accelerations which in the illustrated example corresponds to the accelerations $\ddot{z}_1$ and $\ddot{z}_3$, associated to the two sprung masses $Ms_1$ and $Ms_3$ arranged in two respective angles, e.g. the angles 2a and 2c, arranged on the same right hand Dx or left-hand SX side, so as to determine the second damping coefficients $c^P_i$ (i comprised between 1 and 4) to be imposed to the semi-active suspensions 5 by controlling the force generator 7 for minimizing the dynamics associated to the pitch of the vehicle 1.

In particular, the pitch acceleration is correlated to the difference between the accelerations $\ddot{z}_1$ and $\ddot{z}_3$ associated to two sprung masses $Ms_1$ and $Ms_3$.

According to a preferred embodiment, the second control module 14 calculates the second damping coefficients $c^P_i$ by means of the following calculation law:

$$\ddot{\theta}(t) = \ddot{z}_1(t) - \ddot{z}_3(t)$$

$$S_\theta(t) = \ddot{\theta}^2(t) - (\alpha_\theta \dot{\theta}(t))^2$$

$$C_1^P(t) = C_2^P(t) = f_{front}(S_\theta(t))$$

$$C_3^P(t) = C_4^P(t) = f_{rear}(S_\theta(t)) \qquad [3]$$

where:

$\ddot{\theta}(t)$ is the pitch acceleration of the vehicle in instant t expressed in m/s²;

$\dot{\theta}(t)$ is the pitch speed of the vehicle in instant t expressed in m/s;

$\alpha_\theta$ is the first value indicative of the invariance frequency or cross-over frequency expressed in radians/second for the pitch motion of the vehicle;

$S_\theta(t)$ is a third function which provides a second value indicative of the frequency of the energizing energy to which the i-th sprung mass is subjected in instant t caused by the pitch dynamics;

$f_{front}(S_\theta(t))$ is a fourth function providing a third value which is indicative of the variance of the two second damping coefficients $C_1^P(t)$ e $C_2^P(t)$ to be set on the force generators 7 of the respective semi-active suspensions 5 arranged in angles 2a and 2b present on the front side of the vehicle; and $f_{rear}(S_\theta(t))$ is a fourth function providing a third value which is indicative of the variance of the two second damping coefficients $C_3^P(t)$ e $C_4^P(t)$ to be set on the force generators 7 of the respective semi-active suspensions 5 arranged in the angles 2c and 2d present on the rear side of the vehicle.

With reference to FIGS. 4 and 8, the second control module 14 comprises: an adder node 16, which receives in input the accelerations $\ddot{z}_1$ and $\ddot{z}_3$ associated to two sprung masses $Ms_1$ and $Ms_3$, and determines the difference between the accelerations $\ddot{z}_1(t)$ and $\ddot{z}_3(t)$ so as to calculate the pitch acceleration $\ddot{\theta}(t)$; an integration device 24, which receives input the pitch acceleration $\ddot{\theta}(t)$ and integrates it over time so as to calculate the pitch speed $\dot{\theta}(t)$; a multiplier device 25, which revives in input the pitch speed $\dot{\theta}(t)$ and multipliers by a first value indicative of the invariance frequency or cross-over frequency so as to obtain the value $(\alpha_\theta \dot{\theta}(t))$; a squarer device 26 which receives in input the value $(\alpha_{\theta 0} \dot{\theta}(t))$ and squares it so as to obtain the value $(\alpha_\theta \dot{\theta}(t))^2$; a squarer device 27, which receives in input the pitch acceleration $\ddot{\theta}(t)$ so as to square it $\ddot{\theta}(t)^2$; an adder node 28, which receives in input the pitch acceleration $\ddot{\theta}(t)^2$ and the value $(\alpha_\theta \dot{\theta}(t))^2$ and calculates the difference $\ddot{\theta}^2(t) - (\alpha_\theta \dot{\theta}(t))^2$ so as to determine the second value $S_\theta(t)$ indicative of the energizing energy.

With reference to FIGS. 4 and 8, the second control module 14 further comprises a second control block 29 which receives in input the second value $S_\theta(t)$ and implements the fourth function $f_{front}(S_\theta(t))$ so as to output the third value which is indicative of the variation of the two second damping coefficients $C_1^P(t)$ e $C_2^P(t)$ to be set on the force generators 7 of the respective semi-active suspensions 5 arranged in the angles 2a and 2b present on the first side of the vehicle 1.

The second control module 14 further comprises a second control block 30 which receives in input the second value $S_6(t)$ and implements the fourth function $f_{rear}(S_{74}(t))$ so as to output the third value which is indicative of the variation of the two second damping coefficients $C_3^P(t)$ and $C_4^P(t)$ to be set on the force generators 7 of the respective semi-active suspensions 5 arranged in the angles 2c and 2d present on the first side of the vehicle 1.

The supervisor module 15 is configured to generate the damping reference for each angle of the vehicle 1 by comparing the first damping coefficients $c_i^H$ associated to the vertical dynamics of each semi-active suspension 5 generated by the first control module 13 with the second damping coefficients $c_i^P$ generated by the second control module 14.

The supervisor module 15 is configured so as to privilege damping/contrast of low frequency, high energy dynamics, the most perceivable by passengers. Thus supervision is carried out by selecting for each angle of the vehicle the higher damping requested by either the first 13 or the second control module 14.

In particular, the supervisor module 15 is configured so as to receive in input the first and second damping coefficients and $c_i^H$ and $c_i^P$ generated by the first 13 and, respectively, by the second control module 14; determining the higher damping coefficient $C_i^T=\mathrm{MAX}(c_i^H, c_i^P)$ between the two and generated for each semi-active suspension 5 the electric control system Sci which is indicative of the higher damping coefficient $C_i^T$ to be set to the semi-active suspension 5 present in the angle itself, by means of the force generator device 7.

Figure 9:
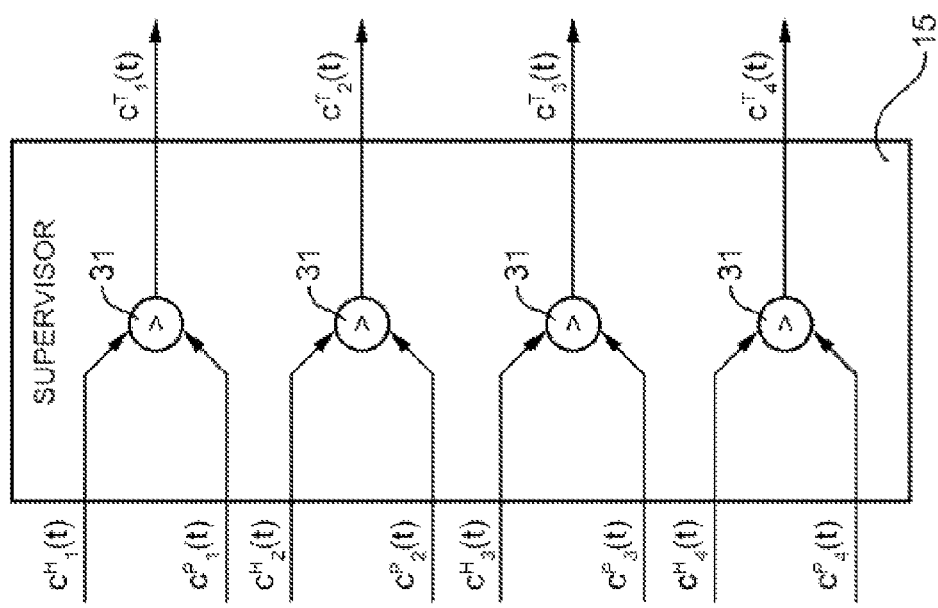

In the embodiment shown in FIG. 9, the supervisor module 15 comprises four comparison device 31, each of which is associated to a corresponding semi-active suspension 5 and is configured for: receiving in input the first and the second damping coefficient $c_i^H$ and $c_i^P$; comparing the first and the second damping coefficient $c_i^H$ and $c_i^P$ so as to determine the higher damping coefficient $C_i^T=\mathrm{MAX}(c_i^H, c_i^P)$; providing the electric control signal Sci($C_i^T$) to the force generator device 7 associated to the semi-active suspension 5 itself.

The control method of the semi-active suspensions 5 provided according to the dictates of the present invention thus contemplates:

receiving in input the three measuring signals representative of the three vertical accelerations $\ddot{z}_1, \ddot{z}_2, \ddot{z}_3$ of the sprung masses $Ms_1$, $Ms_2$ and $Ms_3$ associated to the angles 2a, 2b and 2c and measured by the respective acceleration sensors 10;

processing the three accelerations $\ddot{z}_1, \ddot{z}_2, \ddot{z}_3$ so as to estimate the acceleration $\ddot{z}_4$ of the sprung mass $Ms_4$ associated to the fourth angle 2d, free from acceleration sensor;

processing the three measured accelerations $\ddot{z}_1, \ddot{z}_2, \ddot{z}_3$ and the estimated acceleration $\ddot{z}_4$ for calculating the first damping coefficients $c_i^H$ (i comprised between 1 and 4) adapted to be set on the semi-active suspensions 5 by means of a control of the force generator device 7, to minimizes the variance of the vertical acceleration, i.e. the vertical dynamics of each semi-active suspension 5;

processing two of the four accelerations, e.g. accelerations $\ddot{z}_1$ and $\ddot{z}_3$, associated to two sprung masses $Ms_1$ and $Ms_3$ arranged in two respective angles, e.g. the angles 2a and 2c, arranged on the same side (right side or left side, opposite with respect to the middle line of the vehicle 1), so as to determine second damping coefficients $c_i^P$ (i comprised between 1 and 4) to be set on the semi-active suspensions 5 by means of the force generator control 7 to minimize the pitch dynamics of the vehicle 1;

comparing each first damping coefficient $c_i^H$ with the second damping coefficient $c_i^P$ each associated to the same angle, so as to determine the higher damping coefficient $C_i^T=\mathrm{MAX}(c_i^H, c_i^P)$ between the two, and to generated for each semi-active suspension 5 the electric control signal Sci indicative of the higher damping coefficient $C_i^T$ to be set on the semi-active suspension 5 present in the angle itself by means of the force generator device 7.

The present invention is advantageous because it allows to use only three accelerometers for controlling the four semi-active suspensions, determining in this manner, on one hand, a reduction of the overall manufacturing costs of the system and obtaining, on the other, a simplification of the same in terms of wiring, wire fastening systems, brackets etc.

Furthermore, by virtue of the calculation of the damping coefficient to the imparted to the force generator based on energizing frequency and entity, it is possible to increase the comfort perceived by passengers in case of events which are not very relevant in energy terms, i.e. in case of vehicle stresses having low intensity/energy characterized by a low frequency.

Finally, the method allows to explicitly control pitch dynamics and consequently better results can be obtained also for this type of dynamics.

It is finally apparent that changes and variations can be made to that described and illustrated without departing from the scope of protection of the accompanying claims.

The invention claimed is:

1. A method for controlling a suspension system (4) of a vehicle (1) comprising four semi-active suspensions (5) associated to four respective wheels (3) of the vehicle (1) itself; each semi-active suspension (5) being interposed between a sprung mass (Msi) of the vehicle (1) and a unsprung mass (Nsi) associated to a wheel (3) of the vehicle (1) and being controlled by a respective force generator device (7);

said method being characterized in that it comprises the steps of:
  determining, for each of the four semi-active suspensions (5), a first signal representative of the acceleration of the sprung mass (Msi) associated to the semi-active suspension (5) itself;
  determining, for each of the four semi-active suspensions (5), a second signal representative of the vertical speed of the sprung mass (Msi) associated to the semi-active suspension (5) itself;
  determining, for a pair of semi-active suspensions (5) arranged on a same side (Dx,Sx) of the vehicle (1) parallel to the longitudinal axis (L) of the vehicle (1) itself, a third signal representative of the pitch acceleration of the vehicle (1);
  determining, for a pair of semi-active suspensions (5) arranged on a same side (Dx,Sx) of the vehicle (1) parallel to the longitudinal axis (L) of the vehicle (1) itself, a fourth signal representative of the pitch speed of the vehicle (1);
  calculating for each of the four semi-active suspensions (5), a first damping coefficient ($c_i^H$) associated to the vertical dynamics of said semi-active suspension (5), as a function of the difference between said first signal squared and said second signal squared;
  calculating for each of the four semi-active suspensions (5), a second damping coefficient ($c_i^P$) associated to the pitch of the vehicle (1), as a function of the difference between the third signal squared and the fourth signal squared;

for each semi-active suspension (5), comprising the first damping coefficient ($c^H_i$) with the second damping coefficient ($c^P_i$);

for each semi-active suspension (5), selecting the first (4) or the second damping coefficient ($c^P_i$) on the basis of the comparison;

applying to each of the four force generators (7), an electric control signal (Sci) indicative of the respective selected damping coefficient ($c^H_i$)($c^P_i$).

2. A method according to claim 1, comprising the steps of:

measuring a first ($\ddot{z}_1$), a second ($\ddot{z}_2$) and a third vertical acceleration ($\ddot{z}_3$) of a respective first ($Ms_1$), second ($Ms_2$) and third sprung mass ($Ms_3$);

estimating a fourth acceleration ($\ddot{z}_4$) associated to a fourth sprung mass ($Ms_4$) on the basis of said first ($\ddot{z}_1$) second ($\ddot{z}_2$) and third measured acceleration ($\ddot{z}_3$);

determining the first signal associated to the first ($Ms_1$), to the second ($Ms_2$) and to the third sprung mass ($Ms_3$) as a function of the first ($\ddot{z}_1$), second ($\ddot{z}_2$) and third measured acceleration) ($\ddot{z}_3$);

determining the first signal associated to the fourth sprung mass ($Ms_4$) as a function of said fourth estimated acceleration ($\ddot{z}_4$).

3. A method according to claim 1, wherein in said step of selecting, for each semi-active suspension (5), the first ($c^H_i$) or the second damping coefficient ($c^P_i$) on the basis of said comparison, comprises the step of selecting the damping coefficient ($C^T_i$) which, through the step of comparing, was found to be the highest damping coefficient ($C^T_i$=MAX($c^H_i$, $c^P_i$)) between the first ($c^H_i$) and the second damping coefficient ($c^P_i$).

4. A method according to claim 1, wherein the step of calculating, for each of the four semi-active suspensions (5), a first damping coefficient ($c^H_i$) comprises the steps of:

determining a first value representative of the frequency of the energizing energy to which said semi-active suspension is subjected by means of a first function (Si(t)) associated to the difference between the first signal squared and the second signal squared;

determining the first damping coefficient ($c^H_i$) on the basis of said first value by means of a second function (fi(Si(t))) adapted to provide a third value which is indicative of the variation ($c(t)^H_i$) of said first damping coefficient ($c^H_i$) to be set on the force generator device (7) of said semi-active suspension (5), as said first value varies.

5. A method according to claim 4, wherein:

said first value is determined by means of the following first function:

$$Si(t)=\ddot{z}_i^2(t)-\alpha_i^2 \dot{z}_i^2(t)$$

said third value is determined by means of the following second function:

$$c(t)^H_i=fi(Si(t))$$

where:

$\dot{z}_i(t)$ is the speed expressed in m/s of the i-th sprung mass Msi determined in instant t;

$\ddot{z}_i(t)$ is the acceleration expressed in m/s$^2$ of the i-th sprung mass Msi determined in instant t;

$\alpha_i$ is a first value indicative of the invariance frequency;

Si(t) corresponds to said first function which provides said first value indicative of the frequency of the energizing energy to which the i-th sprung mass is subjected in instant t; and fi(S(t)) is the second function.

6. A method according to claim 2, wherein the step of calculating, for each of the four semi-active suspensions (5), a second damping coefficient ($c^P_i$), comprises the steps of:

determining a third signal associated to a pitch acceleration ($\ddot{\theta}(t)$)) on the basis of the difference between the vertical accelerations ($\ddot{z}_1(t)$, $\ddot{z}_3(t)$) of said pair of semi-active suspensions (5);

determining the fourth signal associated to a pitch speed ($\dot{\theta}(t)$) by integrating the third signal over time;

determining a fourth value representative of the frequency of the energizing energy to which said semi-active suspension (5) is subjected during pitch, by means of a third function associated to the difference between the third signal squared and the fourth signal squared;

determining the second damping coefficient ($c^P_i$) on the basis of said fourth value by means of a fifth function ($f_{front}(S_\theta(t))$), ($f_{rear}(S_\theta(t))$) adapted to provide a sixth value which is indicative of the variation of said second damping coefficient ($c^P_i$) to be set on the force generator device (7) of the semi-active suspension (5), as said fourth value varies.

7. A method according to claim 6, wherein:

a third signal is determined by means of the following equation:

$$\ddot{\theta}(t)=\ddot{z}_1(t)-\ddot{z}_3(t)$$

the fourth value is determined by means of said third function:

$$S_\theta(t)=\ddot{\theta}^2(t)-(\alpha_\theta \dot{\theta}(t))^2$$

the second damping coefficient is determined by means of said fifth function:

$$C_1^P(t)=C_2^P(t)=f_{front}(S_\theta(t))$$

$$C_3^P(t)=C_4^P(t)=f_{rear}(S_\theta(t))$$

where:

$\ddot{\theta}(t)$ is the pitch acceleration of the vehicle in instant t expressed in m/s$^2$;

$\dot{\theta}(t)$ is the pitch speed of the vehicle in instant t expressed in m/s;

$\alpha_\theta$ is the first value indicative of the invariance frequency or cross-over frequency expressed in radians/second for the pitch motion of the vehicle;

$S_\theta(t)$ is the third function which provides the fourth value indicative of the frequency of the energizing energy to which the i-th sprung mass is subjected in instant t caused by the pitch dynamics of the vehicle;

$f_{front}(S_\theta(t))$ is the fifth function providing the sixth value which is indicative of the variance of the two second damping coefficients $C_1^P(t)$ and $C_2^P(t)$ to be set on the force generators 7 of the respective semi-active suspensions 5 arranged in the angles 2a and 2b present on the front side of the vehicle; and $f_{rear}(S_\theta(t))$ is the fifth function providing the sixth value which is indicative of the variance of the two second damping coefficients $C_1^P(t)$ and $C_2^P(t)$ to be set on the force generators 7 of the respective semi-active suspensions 5 arranged in the angles 2c and 2d present on the rear side of the vehicle.

8. An electronic device for controlling a suspension system (4) of a vehicle comprising four semi-active suspensions 5 associated to four respective wheels 3 of the vehicle itself; each semi-active suspension being interposed between a sprung mass of the vehicle and a unsprung mass associated to a wheel of the vehicle and being controlled by a respective force generator device;

said device being configured for:
- determining, for each of the four semi-active suspensions (5), a first signal representative of the acceleration of the sprung mass (Msi) associated to the semi-active suspension (5) itself;
- determining, for each of the four semi-active suspensions (5), a second signal representative of the vertical speed of the sprung mass (Msi) associated to the semi-active suspension (5) itself;
- determining, for a pair of semi-active suspensions (5) arranged on a same side (Dx,Sx) of the vehicle (1) parallel to the longitudinal axis (L) of the vehicle (1) itself, a third signal representative of the pitch acceleration of the vehicle (1);
- determining, for a pair of semi-active suspensions (5) arranged on a same side (Dx,Sx) of the vehicle (1) parallel to the longitudinal axis (L) of the vehicle (1) itself, a fourth signal representative of the pitch speed of the vehicle (1);
- calculating for each of the four semi-active suspensions (5), a first damping coefficient ($c^H_i$) associated to the vertical dynamics of said semi-active suspension (5), as a function of the difference between said first signal squared and said second signal squared;
- calculating for each of the four semi-active suspensions (5), a second damping coefficient ($c^P_i$) associated to the pitch of the vehicle (1), as a function of the difference between the third signal squared and the fourth signal squared;
- for each semi-active suspension (5), comparing the first damping coefficient ($c^H_i$) with the second damping coefficient ($c^P_i$);
- for each semi-active suspension (5), selecting the first ($c^H_i$) or the second damping coefficient ($c^P_i$) on the basis of the comparison;
- applying to each of the four force generators (7), an electric control signal (Sci) indicative of the respective selected damping coefficient ($c^H_i$)($c^P_i$).

9. A device according to claim 8 comprising:
- acceleration measuring means adapted to measure a first ($\ddot{z}_1$), and a second ($\ddot{z}_2$) and a third vertical acceleration ($\ddot{z}_3$) of a respective first ($Ms_1$), second ($Ms_2$) and third sprung mass ($Ms_3$);
- electronic control means configured for:
- estimating a fourth acceleration ($\ddot{z}_4$) associated to a fourth sprung mass ($Ms_4$) on the basis of said first ($\ddot{z}_1$), second ($\ddot{z}_2$) and third measured acceleration ($\ddot{z}_3$);
- determining the first signal associated to the first ($Ms_1$), to the second ($Ms_2$) and to the third sprung mass ($Ms_3$) as a function of the first ($\ddot{z}_1$), second ($\ddot{z}_2$) and third measured acceleration) ($\ddot{z}_3$);
- determining the first signal associated to the fourth sprung mass ($Ms_4$) as a function of said fourth estimated acceleration ($\ddot{z}_4$).

10. A device according to claim 9, wherein in said step of selecting, for each semi-active suspension (5), the first ($c^H_i$) or the second damping coefficient ($c^P_i$) on the basis of said comparison, comprising the step of selecting the damping coefficient ($C^T_i$) which, through the step of comparing, was found to be the highest damping coefficient ($C^T_i$=MAX($c^H_i$, $c^P_i$)) between the first ($c^H_i$) and the second damping coefficient ($c^P_i$).

11. A device according to claim 8, wherein said electronic control means (11) are further configured for:
- determining a first value representing the frequency of the energizing energy to which said semi-active suspension is subjected by means of a first function (Si(t)) associated to the difference between the first signal squared and the second signal squared;
- determining the first damping coefficient ($c^H_i$) on the basis of said first value by means of a second function (fi(Si(t))) adapted to provide a third value which is indicative of the variation ($c(t)^H_i$) of said first damping coefficient ($c^H_i$) to be set on the force generator device (7) of said semi-active suspension (5), as said first value varies.

12. A device according to claim 11, wherein said electronic control means (11) are further configured for:
- determining said first value by means of the following first function:

$$Si(t) = \ddot{z}_i^2(t) - \alpha_i^2 \dot{z}_i^2(t)$$

- determining said third value by means of the following first function:

$$c(t)^h_i = fi(Si(t))$$

where:
- $\dot{z}_i(t)$ is the speed expressed in m/s of the i-th sprung mass Msi determined in instant t;
- $\ddot{z}_i(t)$ is the acceleration expressed in m/s² of the i-th sprung mass Msi determined in instant t;
- $\alpha_i$ is a first value indicative of the invariance frequency;
- Si(t) corresponds to said first function which provide said first value indicative of the frequency of the energizing energy to which the i-th sprung mass is subjected in instant t; and
- fi(S(t)) is the second function.

13. A device according to claim 9, wherein said electronic control means (11) are further configured for:
- determining a third signal associated to a pitch acceleration ($\ddot{\theta}(t)$) on the basis of the difference between the vertical accelerations ($\ddot{z}_1(t)$, $\ddot{z}_3(t)$) of said pair of semi-active suspensions (5);
- determining the fourth signal associated to a pitch speed ($\dot{\theta}(t)$) by integrating the third signal over time;
- determining a fourth value representative of the frequency of the energizing energy to which said semi-active suspension (5) is subjected during pitch, by means of a third function associated to the difference between the third signal squared and the fourth signal squared;
- determining the second damping coefficient ($c^P_i$) on the basis of said fourth value by means of a fifth function ($f_{front}(S_\theta(t))$, ($f_{rear}(S_\theta(t))$ adapted to provide a sixth value which is indicative of the variation of said second damping coefficient ($c^P_i$) to be set on the force generator device (7) of the semi-active suspension (5), as said fourth value varies.

14. A device according to claim 13, wherein said electronic control means (11) are further configured for:
- determining the third signal by means of the following equation:

$$\ddot{\theta}(t) = \ddot{z}_1(t) - \ddot{z}_3(t)$$

- determining the fourth value by means of said third function:

$$S_\theta(t) = \ddot{\theta}^2(t) - (\alpha_\theta \dot{\theta}(t))^2$$

- determining the second damping coefficient by means of one of said fifth functions:

$$C_1^P(t) = C_2^P(t) = f_{front}(S_\theta(t))$$

$$C_3^P(t) = C_4^P(t) = f_{rear}(S_\theta(t))$$

where:
- $\ddot{\theta}(t)$ is the pitch acceleration of the vehicle in instant t expressed in m/s²;

$\dot{\theta}(t)$ is the pitch speed of the vehicle in instant t expressed in m/s;

$\alpha_\theta$ is the first value indicative of the invariance frequency or cross-over frequency expressed in radians/second for the pitch motion of the vehicle;

$S_\theta(t)$ is the third function which provides the fourth value indicative of the frequency of the energizing energy to which the i-th sprung mass is subjected in instant t caused by the pitch dynamics of the vehicle;

$f_{front}(S_\theta(t))$ is the fifth function providing the sixth value which is indicative of the variance of the two second damping coefficients $C_1^P(t)$ e $C_2^P(t)$ to be set on the force generators 7 of the respective semi-active suspensions 5 arranged in the angles 2a and 2b present on the front side of the vehicle;

$f_{rear}(S_\theta(t))$ is the fifth function providing the sixth value which is indicative of the variance of the two second damping coefficients $C_3^P(t)$ e $C_4^P(t)$ to be set on the force generators 7 of the respective semi-active suspensions 5 arranged in the angles 2c and 2d present on the rear side of the vehicle.

15. A program product stored in a non-transitory computer readable medium, the program product causing a vehicular electronic control unit to control a suspension system (4) of a vehicle (1), the suspension system (4) comprising four semi-active suspensions (5) associated to four respective wheels (3) of the vehicle (1) itself; each semi-active suspension (5) being interposed between a sprung mass (Msi) of the vehicle (1) and a unsprung mass (Nsi) associated to a wheel (3) of the vehicle (1) and being controlled by a respective force generator device (7);

the program product making the vehicular electronic control unit execute the steps of:

determining, for each of the four semi-active suspensions (5), a first signal representative of the acceleration of the sprung mass (Msi) associated to the semi-active suspension (5) itself;

determining, for each of the four semi-active suspensions (5), a second signal representative of the vertical speed of the sprung mass (Msi) associated to the semi-active suspension (5) itself;

determining, for a pair of semi-active suspensions (5) arranged on a same side (Dx,Sx) of the vehicle (1) parallel to the longitudinal axis (L) of the vehicle (1) itself, a third signal representative of the pitch acceleration of the vehicle (1);

determining, for a pair of semi-active suspensions (5) arranged on a same side (Dx,Sx) of the vehicle (1) parallel to the longitudinal axis (L) of the vehicle (1) itself, a fourth signal representative of the pitch speed of the vehicle (1);

calculating for each of the four semi-active suspensions (5), a first damping coefficient ($c^H_i$) associated to the vertical dynamics of said semi-active suspension (5), as a function of the difference between said first signal squared and said second signal squared;

calculating for each of the four semi-active suspensions (5), a second damping coefficient ($c^P_i$) associated to the pitch of the vehicle (1), as a function of the difference between the third signal squared and the fourth signal squared;

for each semi-active suspension (5), comprising the first damping coefficient ($c^H_i$) with the second damping coefficient ($c^P_i$);

for each semi-active suspension (5), selecting the first ($c^H_i$) or the second damping coefficient ($c_P^i$) on the basis of the comparison;

applying to each of the four force generators (7), an electric control signal (Sci) indicative of the respective selected damping coefficient ($c^H_i$)($c^P_i$).

* * * * *